United States Patent
Norton et al.

(10) Patent No.: US 10,450,131 B2
(45) Date of Patent: Oct. 22, 2019

(54) COFFEE POD

(71) Applicant: Kraft Foods Group Brands LLC, Chicago, IL (US)

(72) Inventors: Mark Richard Thomas Norton, White Plains, NY (US); Piaras Valdis De Cleir, Marietta, GA (US)

(73) Assignee: Kraft Foods Group Brands LLC, Chicago, IL (US)

( * ) Notice: Subject to any disclaimer, the term of this patent is extended or adjusted under 35 U.S.C. 154(b) by 0 days.

(21) Appl. No.: 15/513,319

(22) PCT Filed: Sep. 30, 2015

(86) PCT No.: PCT/US2015/053227
§ 371 (c)(1),
(2) Date: Mar. 22, 2017

(87) PCT Pub. No.: WO2016/054213
PCT Pub. Date: Apr. 7, 2016

(65) Prior Publication Data
US 2017/0305653 A1    Oct. 26, 2017

Related U.S. Application Data (60) Provisional application No. 62/058,348, filed on Oct. 1, 2014.

(51) Int. Cl.
*B65D 85/804* (2006.01)
*A47J 31/34* (2006.01)
*A47J 31/36* (2006.01)

(52) U.S. Cl.
CPC ........... *B65D 85/8043* (2013.01); *A47J 31/34* (2013.01); *A47J 31/368* (2013.01)

(58) Field of Classification Search
CPC .................................................. B65D 85/8043
See application file for complete search history.

(56) References Cited

U.S. PATENT DOCUMENTS

| | | | |
|---|---|---|---|
| 2,088,181 | A | 7/1937 | Swift |
| 2,778,739 | A | 1/1957 | Rodth |
| D190,530 | S | 6/1961 | Bender |
| 3,070,275 | A | 12/1962 | Donald |
| 3,083,101 | A | 3/1963 | Jean |
| D195,004 | S | 4/1963 | Eicholtz |
| D195,005 | S | 4/1963 | Eicholtz |
| D197,313 | S | 1/1964 | Wanderer |
| 3,128,029 | A | 4/1964 | Price |

(Continued)

FOREIGN PATENT DOCUMENTS

| | | |
|---|---|---|
| CA | 2421128 | 5/2008 |
| CA | 2674483 | 2/2015 |

(Continued)

OTHER PUBLICATIONS

Oxford English Dictionary, Adhere, [on line], in use as early as 1557 retrived Aug. 4, 2018, Retrieved from the Internet: URL<http://www.oed.com/viewdictionaryentry/Entry/2327>.*

(Continued)

*Primary Examiner* — Viren A Thakur
*Assistant Examiner* — Chaim A Smith
(74) *Attorney, Agent, or Firm* — Fitch, Even Tabin & Flannery LLP (57) ABSTRACT

A coffee pod is described with an improved sealing surface for a filter disposed within the pod. The improved sealing surface provides better adherence between the filter and a sidewall of the pod so that unadhered portions are minimized and operation is improved. A coffee pod is also described with an improved foot structure having a configuration and thickness designed to minimize buckling while also utilizing a cost-efficient amount of material.

12 Claims, 8 Drawing Sheets

(56) References Cited

U.S. PATENT DOCUMENTS

| | | |
|---|---|---|
| 3,186,850 A | 6/1965 | Roy |
| 3,292,527 A | 12/1966 | Roland |
| 3,336,857 A | 8/1967 | Knodt |
| 3,398,836 A | 8/1968 | Max |
| 3,403,617 A | 10/1968 | Lampe |
| 3,443,714 A | 5/1969 | Edwards |
| 3,443,715 A | 5/1969 | Edwards |
| 3,445,237 A | 5/1969 | Gidge |
| D216,870 S | 3/1970 | Gregor |
| D221,418 S | 8/1971 | Kinney |
| 3,607,297 A | 9/1971 | Fasano |
| 3,811,373 A | 5/1974 | Telco |
| 3,812,273 A | 5/1974 | Schmidt |
| 3,823,656 A | 7/1974 | Vander Veken |
| 3,833,740 A | 9/1974 | Schmidt |
| 3,878,772 A | 4/1975 | Nordskog |
| D235,246 S | 6/1975 | Evans |
| 3,937,134 A | 2/1976 | Molenaar |
| 3,971,305 A | 7/1976 | Daswick |
| D241,228 S | 8/1976 | Boduch |
| 4,075,107 A | 2/1978 | Smith |
| 4,094,234 A | 6/1978 | Olney |
| D248,358 S | 7/1978 | Thomas |
| 4,098,177 A | 7/1978 | Olney |
| 4,133,769 A | 1/1979 | Morgan |
| 4,136,202 A | 1/1979 | Favre |
| D255,529 S | 6/1980 | Dziekonski |
| 4,206,694 A | 6/1980 | Moskowitz |
| D256,682 S | 9/1980 | Lee |
| D260,243 S | 8/1981 | Dogliotti |
| 4,306,492 A | 12/1981 | Zimmermann |
| 4,321,139 A | 3/1982 | Auclair |
| D264,686 S | 6/1982 | Davis |
| 4,334,640 A | 6/1982 | Van Overbruggen |
| D265,462 S | 7/1982 | Andrulionis |
| 4,362,623 A | 12/1982 | Holopainen |
| 4,382,402 A | 5/1983 | Alvarez |
| 4,417,504 A | 11/1983 | Yamamoto |
| 4,452,130 A | 6/1984 | Klein |
| D275,179 S | 8/1984 | Spencer |
| 4,471,689 A | 9/1984 | Piana |
| 4,522,298 A | 6/1985 | Weinberger |
| D288,515 S | 3/1987 | Rimmeir |
| 4,724,752 A | 2/1988 | Aliesch |
| 4,738,378 A | 4/1988 | Oakley |
| 4,775,048 A | 10/1988 | Baecchi |
| 4,800,089 A | 1/1989 | Scott |
| 4,818,544 A | 4/1989 | Seward |
| 4,846,052 A | 7/1989 | Favre |
| 4,853,234 A | 8/1989 | Bentley |
| 4,859,337 A | 8/1989 | Woltermann |
| 4,867,993 A | 9/1989 | Nordskog |
| 4,873,915 A | 10/1989 | Newman |
| 4,875,408 A | 10/1989 | McGee |
| 4,886,674 A | 12/1989 | Seward |
| D306,928 S | 3/1990 | Hanna |
| D306,974 S | 4/1990 | Tholstrup |
| 4,920,870 A | 5/1990 | Newman |
| 4,921,712 A | 5/1990 | Malmquist |
| 4,975,292 A | 12/1990 | Loizzi |
| 4,990,352 A | 2/1991 | Newman |
| 5,043,172 A | 8/1991 | Loizzi |
| 5,072,660 A | 12/1991 | Helbling |
| 5,082,676 A | 1/1992 | Love |
| 5,108,768 A | 4/1992 | So |
| 5,134,924 A | 8/1992 | Vicker |
| 5,150,645 A | 9/1992 | Schiettecatte |
| 5,178,058 A | 1/1993 | Van Dort |
| 5,197,374 A | 3/1993 | Fond |
| D335,531 S | 5/1993 | Kunze |
| 5,230,867 A | 7/1993 | Kunze |
| 5,242,702 A | 9/1993 | Fond |
| 5,243,164 A | 9/1993 | Erickson |
| 5,259,295 A | 11/1993 | Timm |
| D342,447 S | 12/1993 | Aylward |
| 5,272,960 A | 12/1993 | Kinna |
| 5,279,442 A | 1/1994 | Jentzsch |
| 5,287,797 A | 2/1994 | Grykiewicz |
| 5,298,267 A | 3/1994 | Gruenbacher |
| 5,325,765 A | 7/1994 | Sylvan |
| 5,327,815 A | 7/1994 | Fond |
| 5,343,799 A | 9/1994 | Fond |
| 5,347,916 A | 9/1994 | Fond |
| 5,363,745 A | 11/1994 | Lin |
| 5,398,595 A | 3/1995 | Fond |
| 5,398,596 A | 3/1995 | Fond |
| 5,424,083 A | 6/1995 | Lozito |
| 5,440,972 A | 8/1995 | English |
| 5,472,719 A | 12/1995 | Favre |
| 5,531,152 A | 7/1996 | Gardosi |
| 5,603,254 A | 2/1997 | Fond |
| D379,287 S | 5/1997 | Carlson |
| 5,637,335 A | 6/1997 | Fond |
| 5,638,741 A | 6/1997 | Cisaria |
| D381,558 S | 7/1997 | Schaefer |
| 5,649,412 A | 7/1997 | Binacchi |
| 5,649,472 A | 7/1997 | Fond |
| 5,656,311 A | 8/1997 | Fond |
| 5,656,316 A | 8/1997 | Fond |
| D389,741 S | 1/1998 | Barrie |
| D394,005 S | 5/1998 | Marijnissen |
| 5,762,987 A | 6/1998 | Fond |
| 5,776,527 A | 7/1998 | Blanc |
| 5,794,519 A | 8/1998 | Fischer |
| 5,826,492 A | 10/1998 | Fond |
| 5,840,189 A | 11/1998 | Sylvan |
| D404,262 S | 1/1999 | McGill |
| D408,679 S | 4/1999 | Potts |
| 5,895,672 A | 4/1999 | Cooper |
| 5,897,899 A | 4/1999 | Fond |
| 5,899,137 A | 5/1999 | Miller |
| 5,906,844 A | 5/1999 | Stahli |
| 5,921,168 A | 7/1999 | Nello |
| 5,948,455 A | 9/1999 | Schaeffer |
| 5,952,028 A | 9/1999 | Lesser |
| D415,024 S | 10/1999 | McCann |
| D415,025 S | 10/1999 | McCann |
| 5,974,950 A | 11/1999 | King |
| 6,009,792 A | 1/2000 | Kraan |
| D419,821 S | 2/2000 | Shindate |
| 6,021,705 A | 2/2000 | Dijs |
| 6,024,000 A | 2/2000 | Goldmann |
| 6,025,000 A | 2/2000 | Fond |
| 6,062,127 A | 5/2000 | Klosinski |
| 6,068,871 A | 5/2000 | Fond |
| 6,079,315 A | 6/2000 | Beaulieu |
| 6,082,247 A | 7/2000 | Beaulieu |
| D429,150 S | 8/2000 | Lindsay |
| D429,446 S | 8/2000 | Toussant |
| 6,109,168 A | 8/2000 | Illy |
| 6,117,471 A | 9/2000 | King |
| 6,142,063 A | 11/2000 | Beaulieu |
| 6,170,386 B1 | 1/2001 | Paul |
| 6,182,554 B1 | 2/2001 | Beaulieu |
| 6,186,051 B1 | 2/2001 | Aarts |
| 6,189,438 B1 | 2/2001 | Bielfeldt |
| D438,794 S | 3/2001 | Miles |
| 6,240,832 B1 | 6/2001 | Schmed |
| 6,245,371 B1 | 6/2001 | Gutwien |
| D445,674 S | 7/2001 | Pritchett |
| D445,677 S | 7/2001 | Lindsay |
| 6,289,948 B1 | 9/2001 | Jeannin |
| D450,240 S | 11/2001 | Haag |
| D452,433 S | 12/2001 | Lazaris |
| D452,434 S | 12/2001 | Sweeney |
| 6,347,725 B1 | 2/2002 | Yoakim |
| 6,358,545 B1 | 3/2002 | Chandler |
| 6,405,637 B1 | 6/2002 | Cai |
| 6,440,256 B1 | 8/2002 | Gordon |
| D462,865 S | 9/2002 | Honan |
| D462,900 S | 9/2002 | Yamada |
| D465,154 S | 11/2002 | O'Brien |
| 6,499,388 B2 | 12/2002 | Schmen |
| D474,110 S | 5/2003 | Sweeney |

(56) References Cited

U.S. PATENT DOCUMENTS

| | | |
|---|---|---|
| D474,111 S | 5/2003 | Lazaris |
| 6,589,577 B2 | 7/2003 | Lazaris |
| 6,606,938 B2 | 8/2003 | Taylor |
| 6,607,762 B2 | 8/2003 | Lazaris |
| 6,612,224 B2 | 9/2003 | Mercier |
| 6,644,173 B2 | 11/2003 | Lazaris |
| 6,645,537 B2 | 11/2003 | Sweeney |
| 6,648,163 B2 | 11/2003 | Porter |
| 6,655,260 B2 | 12/2003 | Lazaris |
| 6,658,989 B2 | 12/2003 | Sweeney |
| 6,666,130 B2 | 12/2003 | Taylor |
| 6,672,200 B2 | 1/2004 | Duffy |
| 6,698,228 B2 | 3/2004 | Kateman |
| 6,698,333 B2 | 3/2004 | Halliday |
| 6,708,600 B2 | 3/2004 | Winkler |
| D489,215 S | 5/2004 | Honan |
| 6,740,345 B2 | 5/2004 | Cai |
| 6,758,130 B2 | 7/2004 | Sargent |
| 6,786,134 B2 | 9/2004 | Green |
| 6,786,136 B2 | 9/2004 | Cirigliano |
| 6,810,788 B2 | 11/2004 | Hale |
| 6,832,542 B2 | 12/2004 | Hu |
| 6,849,285 B2 | 2/2005 | Masek |
| D502,362 S | 3/2005 | Lazaris |
| D506,926 S | 7/2005 | Halliday |
| 6,935,222 B2 | 8/2005 | Chen |
| 6,941,855 B2 | 9/2005 | Denisart |
| 6,948,420 B2 | 9/2005 | Kirschner |
| D510,679 S | 10/2005 | Smith |
| D511,965 S | 11/2005 | Luc |
| D513,152 S | 12/2005 | Cahen |
| D513,572 S | 1/2006 | Metaxatos |
| D519,831 S | 5/2006 | de Cleir |
| D520,185 S | 5/2006 | Zeng |
| 7,063,238 B2 | 6/2006 | Hale |
| 7,165,488 B2 | 1/2007 | Bragg |
| D539,643 S | 4/2007 | Abel |
| 7,213,506 B2 | 5/2007 | Halliday |
| 7,219,598 B2 | 5/2007 | Halliday |
| D544,299 S | 6/2007 | Schaffeld |
| 7,243,598 B2 | 7/2007 | Halliday |
| 7,255,039 B2 | 8/2007 | Halliday |
| 7,287,461 B2 | 10/2007 | Halliday |
| 7,308,851 B2 | 12/2007 | Halliday |
| 7,322,277 B2 | 1/2008 | Halliday |
| 7,325,479 B2 | 2/2008 | Laigneau |
| 7,328,651 B2 | 2/2008 | Halliday |
| 7,335,387 B2 | 2/2008 | Hayes |
| 7,347,138 B2 | 3/2008 | Bragg |
| 7,360,418 B2 | 4/2008 | Pelovitz |
| 7,377,162 B2 | 5/2008 | Lazaris |
| 7,398,726 B2 | 7/2008 | Streeter |
| 7,418,899 B2 | 9/2008 | Halliday |
| 7,444,925 B2 | 11/2008 | Mahlich |
| 7,490,542 B2 | 2/2009 | Macchi |
| 7,513,192 B2 | 4/2009 | Sullivan |
| 7,523,695 B2 | 4/2009 | Streeter |
| D592,529 S | 5/2009 | Michalsky |
| 7,533,603 B2 | 5/2009 | Halliday |
| 7,533,604 B2 | 5/2009 | Halliday |
| 7,552,672 B2 | 6/2009 | Schmed |
| 7,604,826 B2 | 10/2009 | Denisart |
| D605,502 S | 12/2009 | Honda |
| D606,363 S | 12/2009 | Aardenburg |
| D607,727 S | 1/2010 | Takata |
| 7,640,843 B2 | 1/2010 | Halliday |
| 7,640,845 B2 | 1/2010 | Woodnorth |
| 7,658,141 B2 | 2/2010 | Masek |
| D612,732 S | 3/2010 | Takata |
| D621,698 S | 8/2010 | Cometto |
| 7,793,585 B2 | 9/2010 | Rasmussen |
| 7,815,953 B2 | 10/2010 | Mastropasqua |
| D628,476 S | 12/2010 | Vang |
| D628,883 S | 12/2010 | Stephens |
| 7,921,766 B2 | 4/2011 | Halliday |
| D637,484 S | 5/2011 | Winkler |
| D638,290 S | 5/2011 | Cimmerer |
| D640,100 S | 6/2011 | Shing |
| D640,547 S | 6/2011 | Guillemin |
| D641,592 S | 7/2011 | Davis |
| D642,454 S | 8/2011 | Santoiemmo |
| D645,340 S | 9/2011 | Menard |
| 8,025,210 B2 | 9/2011 | Johnson |
| D647,398 S | 10/2011 | Winkler |
| D647,399 S | 10/2011 | Winkler |
| D649,038 S | 11/2011 | Krueger |
| D649,870 S | 12/2011 | Cometto |
| D651,096 S | 12/2011 | Nakagiri |
| 8,109,200 B2 | 2/2012 | Hansen |
| 8,151,694 B2 | 4/2012 | Jacobs |
| D658,493 S | 5/2012 | Cometto |
| 8,168,247 B2 | 5/2012 | Halliday |
| 8,307,754 B2 | 11/2012 | Ternite |
| 8,361,527 B2 | 1/2013 | Winkler |
| 8,425,964 B2 | 4/2013 | Doglioni |
| D682,675 S | 5/2013 | Rapparini |
| D685,631 S | 7/2013 | Rapparini |
| D689,768 S | 9/2013 | Inderbitzin |
| D694,620 S | 12/2013 | Hansen |
| D695,111 S | 12/2013 | Hansen |
| D697,797 S | 1/2014 | Hansen |
| D698,649 S | 2/2014 | Quint |
| D700,839 S | 3/2014 | O'Brien |
| D703,035 S | 4/2014 | Zanetti |
| D703,039 S | 4/2014 | Hansen |
| D705,064 S | 5/2014 | Sy |
| D707,489 S | 6/2014 | Hertaus |
| D708,057 S | 7/2014 | Hansen |
| D710,686 S | 8/2014 | Gowens |
| D713,259 S | 9/2014 | Fischer |
| D715,649 S | 10/2014 | O'Brien |
| D716,648 S | 11/2014 | Tan |
| 8,906,440 B2 | 12/2014 | Otto |
| D723,868 S | 3/2015 | Hertaus |
| D743,252 S | 11/2015 | Hansen |
| D743,786 S | 11/2015 | Hansen |
| 2001/0047724 A1 | 12/2001 | Lazaris |
| 2001/0048957 A1 | 12/2001 | Lazaris |
| 2002/0015768 A1 | 2/2002 | Masek |
| 2002/0020659 A1* | 2/2002 | Sweeney ............ B65D 85/8043 210/416.3 |
| 2002/0023543 A1 | 2/2002 | Schmed |
| 2002/0048621 A1 | 4/2002 | Boyd |
| 2002/0078831 A1 | 6/2002 | Cai |
| 2002/0088807 A1 | 7/2002 | Perkovic |
| 2002/0121197 A1 | 9/2002 | Mercier |
| 2002/0121198 A1 | 9/2002 | Kollep |
| 2002/0129712 A1 | 9/2002 | Westbrook |
| 2002/0134249 A1 | 9/2002 | Melton |
| 2002/0144603 A1 | 10/2002 | Taylor |
| 2002/0144604 A1 | 10/2002 | Winkler |
| 2002/0148356 A1 | 10/2002 | Lazaris |
| 2002/0148357 A1 | 10/2002 | Lazaris |
| 2002/0185010 A1 | 12/2002 | Spiteri |
| 2003/0005826 A1 | 1/2003 | Sargent |
| 2003/0039731 A1 | 2/2003 | Dalton |
| 2003/0056655 A1 | 3/2003 | Kollep |
| 2003/0066431 A1 | 4/2003 | Fanzutti |
| 2003/0145736 A1 | 8/2003 | Green |
| 2003/0172813 A1 | 9/2003 | Schifferle |
| 2003/0217643 A1 | 11/2003 | Masek |
| 2003/0222089 A1 | 12/2003 | Hale |
| 2004/0045443 A1 | 3/2004 | Lazaris |
| 2004/0163543 A1 | 8/2004 | Hu |
| 2004/0228955 A1 | 11/2004 | Denisart |
| 2005/0051478 A1 | 3/2005 | Karanikos |
| 2005/0150390 A1 | 7/2005 | Schifferle |
| 2005/0172822 A1 | 8/2005 | Macchi |
| 2005/0183581 A1 | 8/2005 | Kirschner |
| 2005/0205601 A1 | 9/2005 | Taylor |
| 2005/0217213 A1 | 10/2005 | Lozinski |
| 2005/0223904 A1 | 10/2005 | Laigneau |
| 2005/0237793 A1 | 10/2005 | Min |
| 2005/0241489 A1 | 11/2005 | Kirschner |

(56) References Cited

U.S. PATENT DOCUMENTS

| | | |
|---|---|---|
| 2005/0266122 A1 | 12/2005 | Franceschi |
| 2005/0287251 A1 | 12/2005 | Lazaris |
| 2006/0107841 A1 | 5/2006 | Schifferle |
| 2006/0174773 A1 | 8/2006 | Taylor |
| 2006/0236871 A1 | 10/2006 | Ternite |
| 2006/0292012 A1 | 12/2006 | Brudevold |
| 2007/0186784 A1 | 8/2007 | Liverani |
| 2008/0095904 A1 | 4/2008 | Sullivan |
| 2008/0115674 A1 | 5/2008 | Huang |
| 2008/0134902 A1 | 6/2008 | Zimmerman |
| 2008/0264267 A1 | 10/2008 | Majer |
| 2009/0007792 A1 | 1/2009 | Glucksman |
| 2009/0007793 A1 | 1/2009 | Glucksman |
| 2009/0175986 A1 | 7/2009 | Majer |
| 2009/0211458 A1* | 8/2009 | Denisart ............ B65D 85/8043 99/300 |
| 2009/0220650 A1 | 9/2009 | Ozanne |
| 2010/0006205 A1 | 1/2010 | McCowin |
| 2010/0024658 A1 | 2/2010 | Jacobs |
| 2010/0028495 A1 | 2/2010 | Novak |
| 2010/0043644 A1 | 2/2010 | Liverani |
| 2010/0043645 A1 | 2/2010 | Liverani |
| 2010/0064899 A1* | 3/2010 | Aardenburg ........ A47J 31/3633 99/295 |
| 2010/0072268 A1 | 3/2010 | Johnson |
| 2010/0239733 A1 | 9/2010 | Yoakim |
| 2010/0288131 A1 | 11/2010 | Kilber |
| 2010/0303964 A1 | 12/2010 | Beaulieu |
| 2011/0030563 A9 | 2/2011 | Majer |
| 2011/0041702 A1* | 2/2011 | Yoakim ............ B65D 85/8043 99/302 R |
| 2011/0076361 A1 | 3/2011 | Peterson |
| 2011/0097450 A1 | 4/2011 | Kruger |
| 2011/0151075 A1 | 6/2011 | Peterson |
| 2011/0200726 A1 | 8/2011 | Tinkler |
| 2011/0212225 A1 | 9/2011 | Mariller |
| 2011/0226343 A1 | 9/2011 | Novak |
| 2011/0274802 A1 | 11/2011 | Rivera |
| 2012/0006205 A1 | 1/2012 | Vanni |
| 2012/0009304 A1 | 1/2012 | Perentes |
| 2012/0118166 A1 | 5/2012 | Macchi |
| 2012/0308688 A1 | 12/2012 | Peterson |
| 2012/0318810 A1 | 12/2012 | Hodge |
| 2012/0321748 A1 | 12/2012 | Otto |
| 2012/0321756 A1 | 12/2012 | Estabrook |
| 2013/0010716 A1 | 1/2013 | Dinan |
| 2013/0059039 A1* | 3/2013 | Trombetta ............ B65B 29/022 426/82 |
| 2013/0108739 A1 | 5/2013 | Markoulis |
| 2013/0156897 A1 | 6/2013 | Goldstein |
| 2014/0010926 A1* | 1/2014 | Digiuni ............ B65D 85/8043 426/112 |
| 2014/0072675 A1 | 3/2014 | Norton |
| 2014/0072677 A1 | 3/2014 | Hansen |
| 2014/0130678 A1 | 5/2014 | Frydman |
| 2014/0141140 A1 | 5/2014 | Bugnano |
| 2014/0161937 A1 | 6/2014 | Rondelli |
| 2014/0234494 A1 | 8/2014 | Doglioni |
| 2014/0318380 A1 | 10/2014 | Doglioni |
| 2014/0373725 A1 | 12/2014 | Mastropasqua |
| 2015/0001100 A1 | 1/2015 | Bartoli |
| 2015/0050391 A1 | 2/2015 | Rapparini |
| 2015/0072057 A1 | 3/2015 | Bugnano |

FOREIGN PATENT DOCUMENTS

| | | |
|---|---|---|
| CA | 2701826 | 8/2015 |
| CN | 101636333 | 1/2010 |
| DE | 2029552 | 12/1971 |
| DE | 3432339 | 10/1987 |
| EP | 0272922 | 6/1988 |
| EP | 0334571 | 9/1989 |
| EP | 0334572 | 9/1989 |
| EP | 0451980 | 10/1991 |
| EP | 0455337 | 11/1991 |
| EP | 0524464 | 1/1993 |
| EP | 554469 | 8/1993 |
| EP | 0638486 | 2/1995 |
| EP | 1042978 | 10/2000 |
| EP | 1208782 | 5/2002 |
| EP | 1255685 | 11/2002 |
| EP | 1344724 | 9/2003 |
| EP | 1440644 | 7/2004 |
| EP | 1440913 | 7/2004 |
| EP | 1529739 | 5/2005 |
| EP | 1580143 | 9/2005 |
| EP | 1792849 | 6/2007 |
| EP | 2119640 | 11/2009 |
| EP | 2230195 | 9/2010 |
| EP | 2239212 | 10/2010 |
| EP | 2284102 | 2/2011 |
| EP | 2287090 | 2/2011 |
| EP | 2404844 | 1/2012 |
| FR | 2946854 | 12/2010 |
| GB | 838829 | 6/1960 |
| GB | 2023086 | 6/2005 |
| GB | 2488799 | 9/2012 |
| GB | 2489409 | 10/2012 |
| GB | 2491154 | 11/2012 |
| JP | 2000355375 | 12/2000 |
| JP | 2001061663 | 3/2001 |
| JP | 2009517158 | 4/2009 |
| WO | 9210919 | 6/1992 |
| WO | 0158786 | 8/2001 |
| WO | 0160219 | 8/2001 |
| WO | 0160220 | 8/2001 |
| WO | 2001060712 | 8/2001 |
| WO | 02074143 | 1/2002 |
| WO | 02074661 | 1/2002 |
| WO | 02082962 | 1/2002 |
| WO | 2002058522 | 8/2002 |
| WO | 03059778 | 1/2003 |
| WO | 2003073896 | 9/2003 |
| WO | 2004006740 | 12/2003 |
| WO | 2004083071 | 1/2004 |
| WO | 2006008243 | 1/2006 |
| WO | 2006030461 | 1/2006 |
| WO | 2007095294 | 1/2007 |
| WO | 2007122144 | 2/2007 |
| WO | 2008116818 | 1/2008 |
| WO | 2008136026 | 1/2008 |
| WO | 2009110783 | 1/2009 |
| WO | 2009115475 | 1/2009 |
| WO | 2010038213 | 1/2010 |
| WO | 2010046923 | 1/2010 |
| WO | 2010085824 | 1/2010 |
| WO | 2010093246 | 1/2010 |
| WO | 2010106516 | 1/2010 |
| WO | 2010115970 | 1/2010 |
| WO | 2010128844 | 2/2010 |
| WO | 2010134036 | 2/2010 |
| WO | 2010137952 | 2/2010 |
| WO | 2010138563 | 2/2010 |
| WO | 2012122329 | 1/2012 |
| WO | 2012127233 | 1/2012 |
| WO | 2012160342 | 2/2012 |
| WO | 2014043102 | 3/2014 |
| WO | 2014043106 | 3/2014 |
| WO | 2014066901 | 5/2014 |

OTHER PUBLICATIONS

International Search Report, dated Dec. 23, 2015 for International Application No. PCT/US2015/053227 (3 pgs.).

English translation of Office Action in corresponding Russion Application No. 2017112069; dated Dec. 20, 2018 (3 pgs.).

Notice on the First Office Action in corresponding Chinese Application No. 201580052688.0; dated Apr. 4, 2018 (10 pgs.).

Notice on the Secod Office Action in corresponding Chinese Application No. 201580052688.0; dated Dec. 11, 2018 (10 pgs.).

(56) References Cited

OTHER PUBLICATIONS

Office Action in corresponding European Application No. 15777848.1; dated Dec. 20, 2018 (4 pgs.).

* cited by examiner

COFFEE POD

CROSS REFERENCE TO RELATED APPLICATIONS

This application is a U.S. national phase application of International Application No. PCT/US2015/053227, filed Sep. 30, 2015, which claims benefit from U.S. Application 62/058,348, filed Oct. 1, 2014, which are hereby incorporated herein by reference in their entirety.

FIELD

This application relates generally to containers for food products, and more particularly to containers having a beverage ingredient and filter therein and configured to have a liquid flow therethrough to create a beverage.

BACKGROUND

Single serve coffee machines produce individual cups of coffee with pods or capsules of individual servings of grinded coffee. A user places the pod into the machine, which then pierces the pod and forces hot water to flow through the grinded coffee and into a container below.

One type of pod for such a coffee machine includes a sidewall and a bottom wall. A filter is adhered inside of the cup to the sidewall and coffee or another beverage ingredient is deposited in the filter. Finally, a cover or lid is sealed to a flange of the sidewall to enclose the coffee within the pod. In use, the cover is pierced to deliver water to the coffee within the body and the bottom wall is pierced to create a dispensing opening. One problem that can result from these actions is that the sidewall and/or bottom wall of the pod can buckle due to the compression forces created during piercing. A buckled sidewall can interfere with the proper creation and delivery of the resulting beverage. Another problem that can result in such a coffee pod is that the seal between the filter and the sidewall can include unadhered portions, which allow coffee grinds to bypass the filter and undesirably end up in the created beverage.

SUMMARY

A coffee pod is described that includes a container body, a filter adhered to the container body within an interior thereof, and a cover or lid sealed over an open mouth of the container body. Any desired beverage ingredient or flavoring material, such as ground coffee or the like, is deposited into the filter within the container body. The container body includes an inwardly sloped wall portion in a side wall thereof that has an upwardly facing surface configured for adhering an outer edge of the filter thereto, in one form, the inwardly sloped wall portion extends between about 40 and 50 degrees, preferably between about 43 and 47 degrees, and more preferably about 45 degrees from vertical. The side wall further includes a stacking shoulder that is spaced from the bottom wall portion by an outwardly tapering side wall bottom portion. A foot portion of the container body, which includes the bottom wall, the outwardly tapering side wall bottom portion and the stacking shoulder, can be configured to strengthen the container body against buckling when the bottom wall is pierced during use. The coffee pod can be formed using any suitable method, including thermoforming, blow molding, injection molding, or the like.

In use, the coffee pod is configured to have water or other liquid pass therethrough in order to create beverage. A liquid delivery device pierces the cover to deliver water to the flavoring material. Additionally, a needle or the like pierces the bottom wall portion to create a dispensing opening for the container body. The container body described herein is advantageously configured and sized to resist buckling so that piercing the bottom wall does not undesirably deform the container body. More specifically, the container body includes a foot portion that is configured to resist buckling. The foot portion includes the bottom wall, an outwardly tapering side wall portion and the stacking shoulder. The configuration utilizes the interaction of these container portions to distribute forces and strengthen the sidewall.

DETAILED DESCRIPTION

A coffee pod is described with an improved sealing surface for a filter disposed within the pod. The improved sealing surface provides better adherence between the filter and a sidewall of the pod so that unadhered portions are minimized and operation is improved. Any unadhered portions of the filter can undesirably allow ground coffee to flow around the filter and into a cup of a user.

A coffee pod is also described with an improved foot structure having a configuration and thickness designed to minimize buckling while also utilizing a cost-efficient amount of material. During use, a single serve coffee machine pierces a bottom surface of the coffee pod. During piercing, the pod can buckle, which can interfere with creation of desirable coffee.

Details of a coffee pod 10 having these properties are described below with reference to FIGS. 1-9. The coffee pod includes a base cup 12 and a cover or lid 14 configured to be sealed thereto. The cup 12 has a bottom wall portion 16 and a sidewall portion 18 extending upwardly from an edge 19 thereof. The bottom and side walls 16, 18 define an interior 20 of the cup 12 configured to receive a filter 22 and flavoring material, such as ground coffee, therein, as described in more detail below. In the illustrated form, the bottom wall 16 is generally circular such that the sidewall 18 is generally tubular extending upwardly from the annular edge 19 thereof. If desired, the sidewall 18 can taper outwardly, as shown.

The sidewall 18 includes an upper rim or flange 26 that extends outwardly from an upper edge 28 of the sidewall 18 opposite of the bottom wall 16. Extending downwardly from the upper edge 28, the sidewall includes a top neck portion 30 that transitions to an inwardly sloped wall portion 32. As shown, an outer corner 33 between the neck portion 30 and the flange 26 can be chamfered as shown. An interior surface 34 of the inwardly sloped wall portion 32 provides a surface for adhering the filter 22 to the cup 12, as described in greater detail below. A middle portion 36 of the sidewall 18 includes an undulating or ribbed wail portion 38 and an upper transition portion 40 that transitions the sidewall between the sloped wall 32 and the undulating wall 38. As shown, the upper transition portion 40 can have an inward slope similar to the sloped wall portion 32 so that it is generally recessed with respect to the undulating wall 38. In the illustrated form, the transition portion 40 has a slightly more vertical slope as compared to the slope of the sloped wall portion 32.

The sloped wall 32 is preferably configured to extend along an angle with respect to vertical that advantageously provides a good seal between the sidewall 18 and the filter 22 as compared to other configurations. In one form, the sloped wall 32 extends at between about 30 degrees and about 60 degrees downwardly from a vertical plane, and specifically between about 40 degrees and 50 degrees, and more specifically between about 43 degrees and 47 degrees. In the illustrated form, the sloped wall 32 extends at about 45 degrees from a vertical plane. Previous coffees pods adhered their filters to sidewall portions at a much steeper slope, such as about 14 degrees. While this provides for a wider pod interior due to the wall not extending as far into the interior of the pod, the connection between the filter and the sidewall can undesirably have unadhered portions due to inconsistencies in the sidewall resulting from the formation process or handling. A plunger or the like inserts the filter into the pod and, as such, with the highly sloped walls of the previous coffee pods, any inconsistencies can prevent the plunger from completely entering the pod to complete a satisfactory seal.

In contrast, the sloped wall 32 described herein extends on a relatively more horizontal plane so that any inconsistencies on the upward facing surface 34 have a less deleterious effect on the seal between the filter 22 and the sidewall 18, i.e., the plunger need not travel as far into the pod 10 and the seal surface 34 provides a hard stop for the plunger to compress the filter against the sidewall 18. In the illustrated form, the sloped wall 32 extends at a 45 degree angle for about 2 mm.

The undulating wall 38 extends downwardly to an inwardly projecting stacking shoulder 42. The stacking shoulder 42 provides an upward facing surface 44 in the interior 20 of the cup 12 that advantageously provides a support surface 44 for the bottom wall of another cup stacked therein. The stacking shoulder 42 prevents the cups 12 from completely nesting together when stacked which can undesirably create a vacuum between the cups and/or sidewall-to-sidewall friction and make them difficult to separate. Additionally, the thickness of the sidewall 18 can create friction between stacked cups also making stacks of cups difficult to separate. In the illustrated form, the stacking shoulder 42 extends generally horizontally, but can extend at an angle with respect thereto if desired. Finally, the sidewall 18 includes an outwardly tapering bottom wall portion 46 that extends from an inner edge 48 of the shoulder 42 to an outer edge 50 of the bottom wail 16. A bottom, foot portion 52 of the cup 12 includes the bottom wall 16, the bottom wall portion 46, and the shoulder 42.

Figure 1:
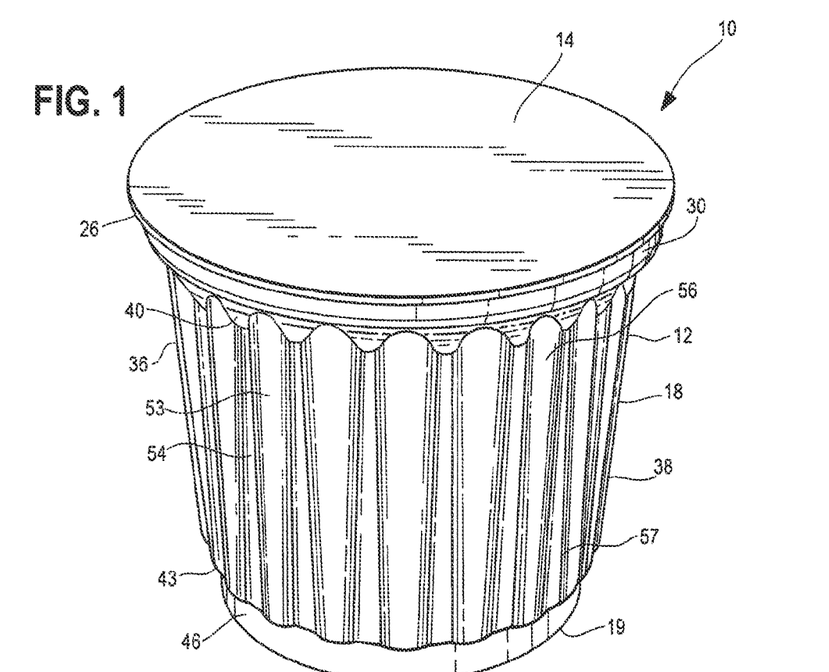
FIG. 1 is a perspective view of a coffee pod having a container and a cover sealed thereto.
Figure 2:
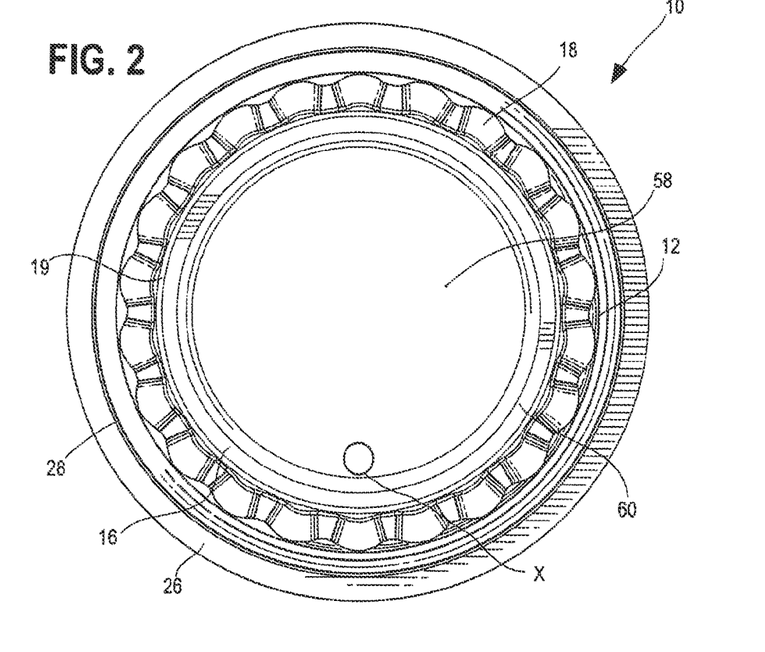
FIG. 2 is a bottom view of the coffee pod of FIG. 1.
Figure 3:
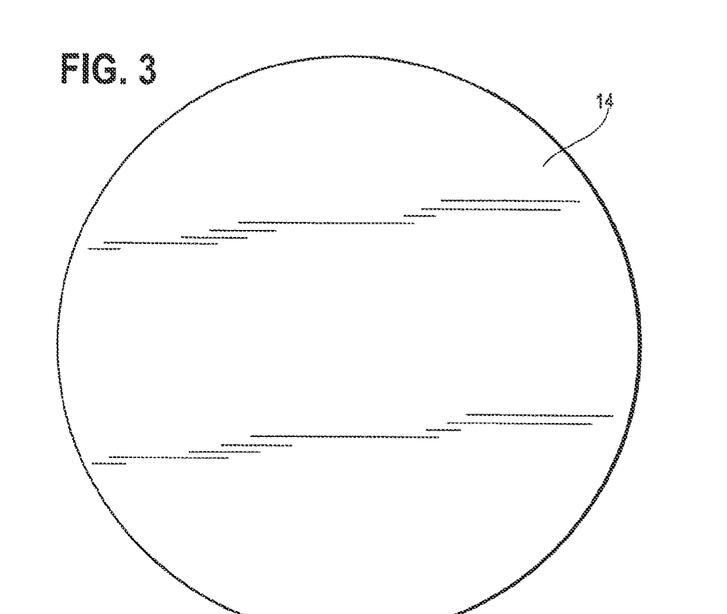
FIG. 3 is a top view of the coffee pod of FIG. 1.
Figure 4:
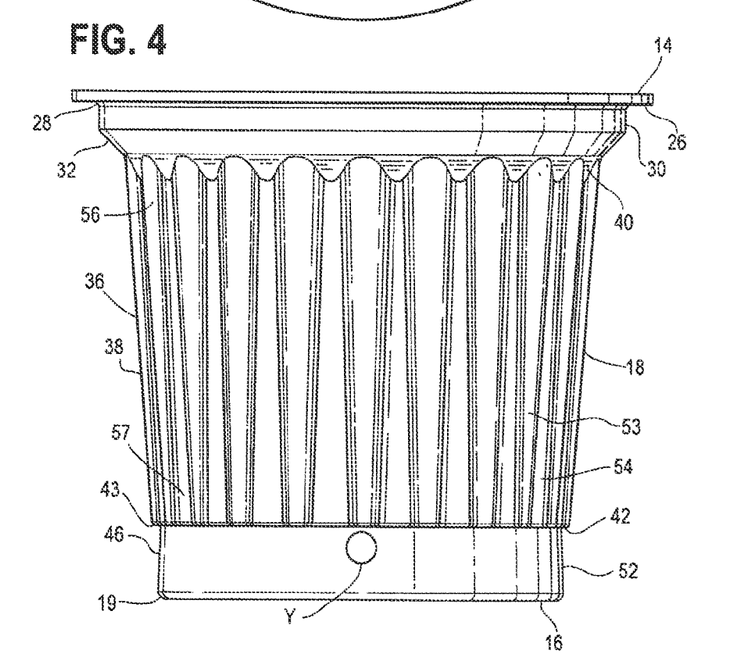
FIG. 4 is a side elevation view of the coffee pod of FIG. 1.
Figure 5:
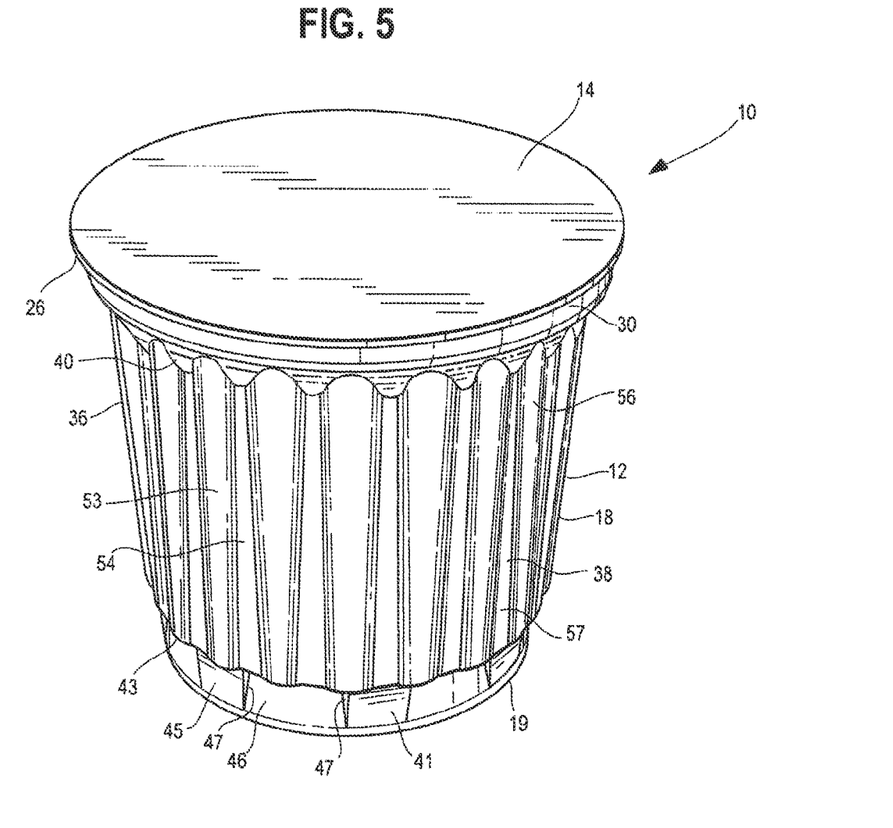
FIG. 5 is a perspective view of another embodiment of a coffee pod having a container and a cover sealed thereto.
Figure 6:
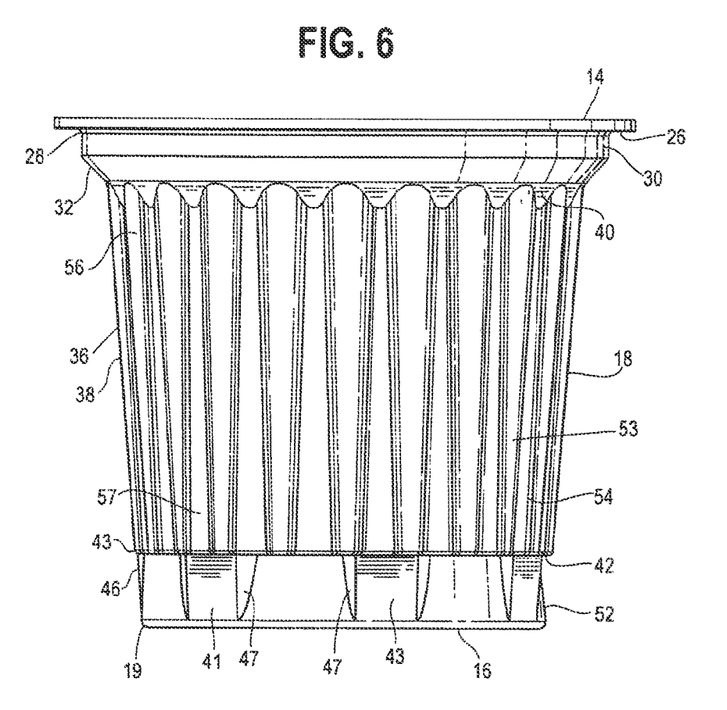
FIG. 6 is a side elevation view of the coffee pod of FIG. 5.

In another embodiment, as shown in FIGS. 5 and 6, the foot portion 52 further includes a series of spaced projections 41 that extend between the bottom wall outer edge 50 and a bottom edge 43 of the undulating wall 38 so that the bottom wall portion 26 has a stepped configuration. As shown in the figures, each projection 42 can include an outwardly facing wall portion 45 and two lateral transition wall portions 47 that extend between the outward wall 45 and the bottom wall portion 26. As a result of the angle of the bottom wall portion 26 and the outward wall 45, the transition wall portions 27 are generally triangular as shown. In the illustrated form, the cup 12 includes six projections 41 spaced evenly around the foot portion 52. Any other number of projections 41 could also be used for other applications or sizes.

In the illustrated form, the undulating wall 38 includes a repeating, fluted pattern of curved columns 53 and troughs 54. As a result of the tapered configuration of the sidewall middle portion 36, the columns and troughs 53, 54 can similarly taper from a relatively wider top portion 56 to a relatively narrower bottom portion 57. The columns and troughs 53, 54 act to reinforce the sidewall 18 against compression forces. Additionally, the bottom wall 16 can have a raised interior region 58 so that the cup 12 rests on an outer annular ring 60 of the bottom wall 16. In the illustrated form, a transition between the raised interior region 58 and the outer annual ring 60 has a radius of about 1.5 mm. Moreover, the raised interior region 58 can be raised from the outer annular ring 60 by about 0.8 mm, or between about 1% and 2% of a height of the side wall 18.

As briefly discussed above, the coffee pod 10 is configured to be assembled prior to shipping, storage, and use. To prepare the coffee pod 10, the cup 12 can be formed in any suitable fashion, including thermoforming and the like. The filter 22 can then be inserted and adhered within the cup 12. As shown, the filter 22 can be sized to have a diameter larger than a diameter of the cup 12. In the illustrated form, the filter 22 is cut to a disk-shape having a diameter between about 1.5 and 3 times larger than the diameter of the cup 12, and more preferably about 2 times larger. As such, when the filter 22 is inserted or otherwise forced into the interior 20 of the cup 12, such as using a mandrel the filter 22 forms a cup shape within the cup 12. An outer edge portion 62 of the filter 22 is adhered or otherwise attached to the sloped wall portion 32 so that an interior portion 64 of the filter can hang downward within the interior 20 of the cup 12. For example, the mandrel used to insert the filter 22 and form its cup shape can apply heat to adhere the filter 22. By one approach, the filter 22 and cup sidewall 18 can be sized so that a lowermost point 66 of the filter 22 is spaced from the cup bottom wall 16. Alternatively, the filter 22 can be sized so that it reaches the bottom wall 16 when it is secured within the cup 12.

After the filter 22 is secured to the cup 12, flavoring material 68, such as coffee grounds, instant coffee, tea leaves, herbs, spices, or other natural or unnatural flavoring materials, is deposited into the cup interior 20 so that the flavoring material 68 is received within the suspended filter 22. The cup 12, filter 22, and amount of flavoring material 68 can advantageously be sized and configured according to the end amount of beverage that is desired. Additionally, in one form, the level of flavoring material 68 received within cup 12 preferably does not rest above the sloped wall portion 32 and the outer edge 62 of the filter 22 secured thereto.

Finally, the cover 14 can be sealed to the cup flange 26 to seal the flavoring material 68 inside of the cup interior 20.

Figures 8, 9:
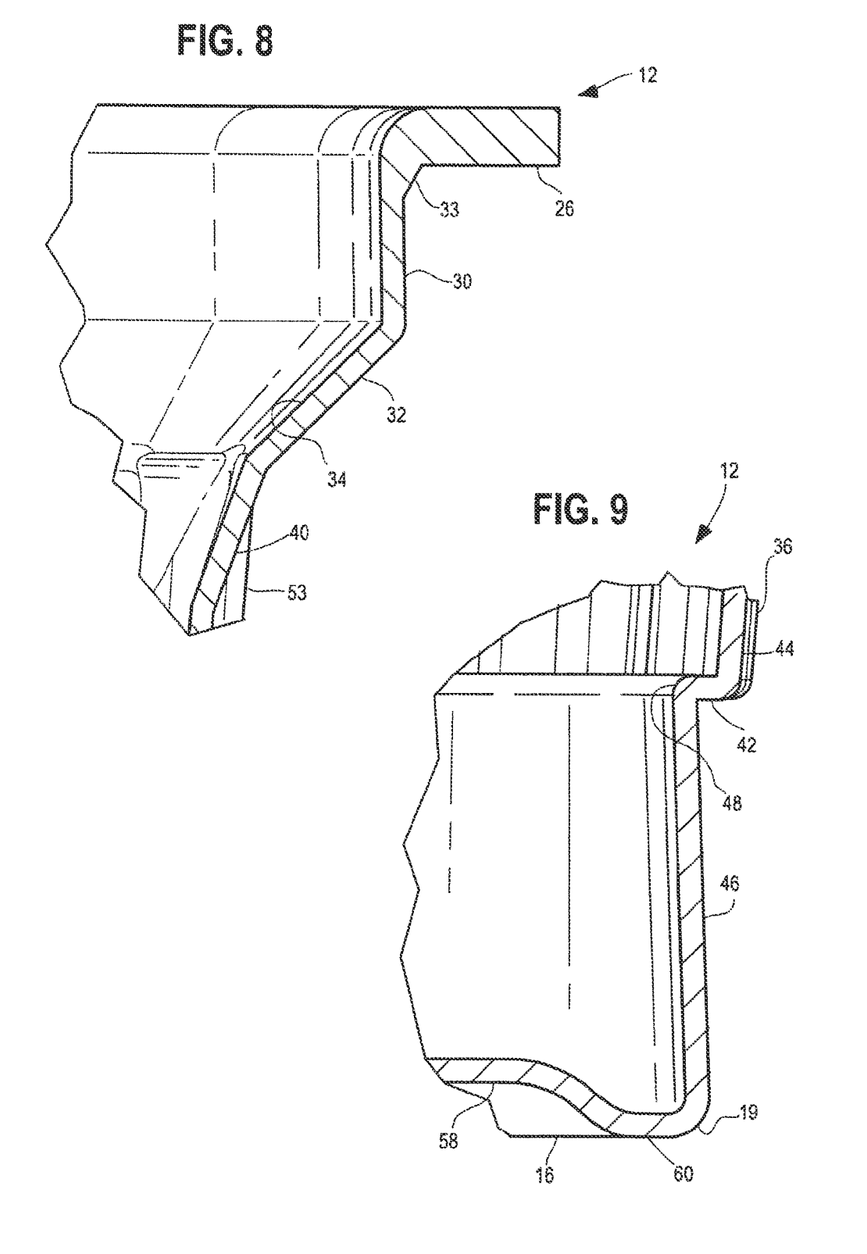
FIG. 8 is a cross-sectional view of a portion of a coffee pod container showing an upper flange and an inwardly sloped sidewall portion.
FIG. 9 is a cross-sectional view of a portion of a coffee pod container showing a foot portion including a bottom wall, outwardly tapering wall portion, and stacking shoulder.
Figure 10:
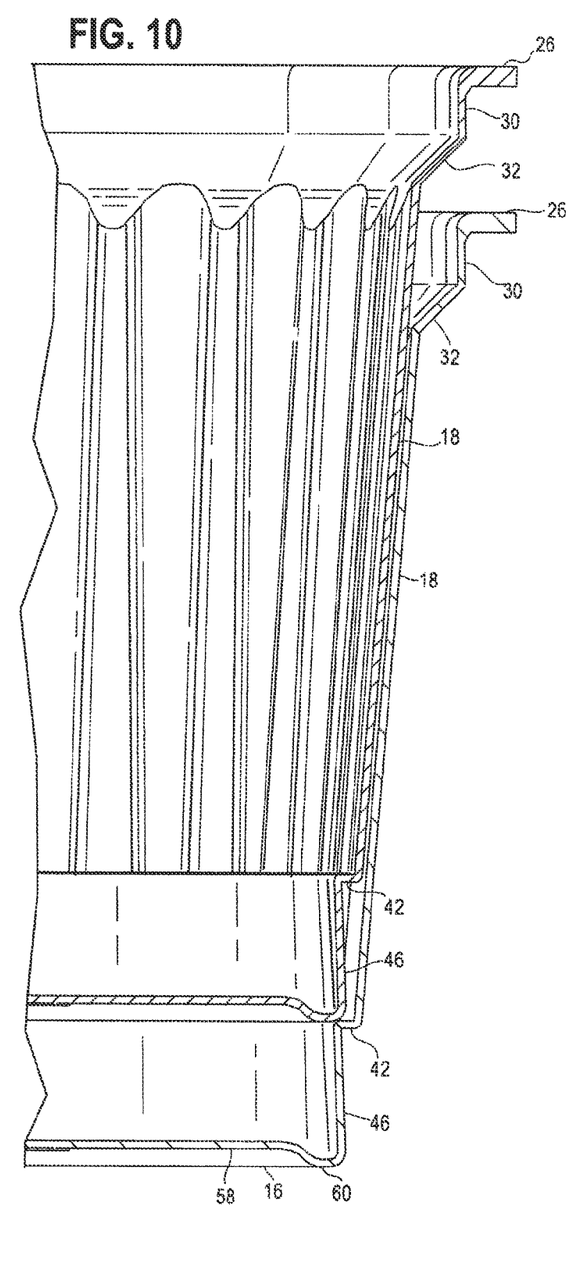
FIG. 10 is an exploded view of a coffee pod showing a container, a filter, and a cover.
Figure 11:
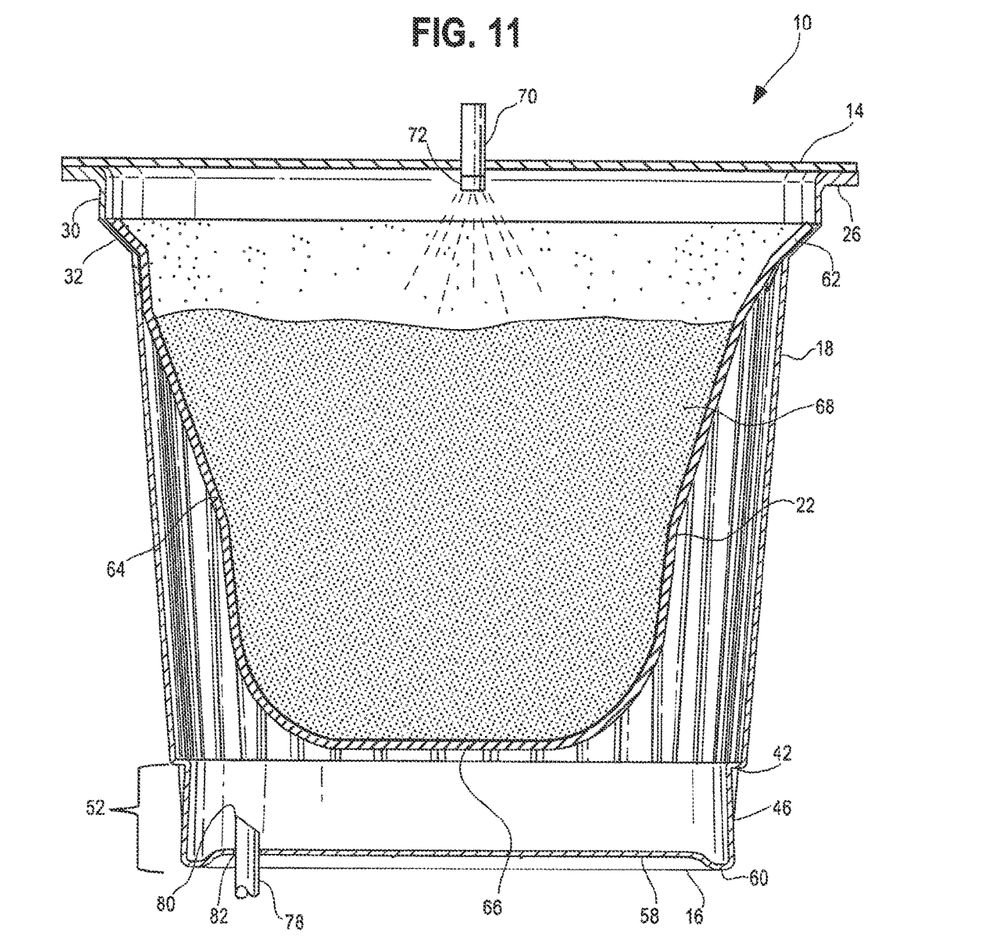
FIG. 11 is a cross-sectional view of a coffee pod showing a water delivery device piercing a cover thereof and an outlet needle piercing the bottom wall thereof to create a dispensing opening.

Turning now to details of the use of the coffee pod 10, which are shown in FIG. 9, the coffee pod 10 is configured to be loaded into in a suitable coffee machine. The coffee machine punctures the coffee pod 10 through the cover 14 with an inlet tube or pipe 70 that, in one form, is configured to deliver hot water to the cup interior 20. The pipe 70 can be fitted with a sprayer 72 or other delivery mechanism to spray the flavoring material 68 with hot water.

In order to deliver or deposit the resulting beverage, such as coffee in the illustrated form, to a mug or other receptacle, the cup bottom wall 16 is pierced by one or more outlet instruments or needles 78 so that the beverage 74 can drain downwardly out the pod 10 through an opening 82 created by the needle 78. In the illustrated form, the bottom wall 16 is pierced by a single shaft 78 with a sharpened end 80.

Piercing the bottom wall 16 creates a compression force on the pod 10 which can undesirably cause the sidewall 18 to buckle or otherwise deform. In such a case, the opening resulting from the piercing can be undesirably irregular or the buckled sidewall 18 can interfere with the creation of a desirable beverage. In order to minimize the occurrence of buckling, the pod foot 52 described herein is configured to resist the compression forces from piercing.

Simply increasing the thickness of the sidewall 18 and/or bottom wall 16 is not satisfactory because it increases the costs of production as well as creating the possibility of sidewall-to-sidewall friction between stacked cups. Also, simply increasing the thickness of the sidewall 18 and bottom wall 16 will not provide desired results because a larger piercing force is required for a thicker bottom wall 16 necessitating increased strength against buckling.

Figure 7:
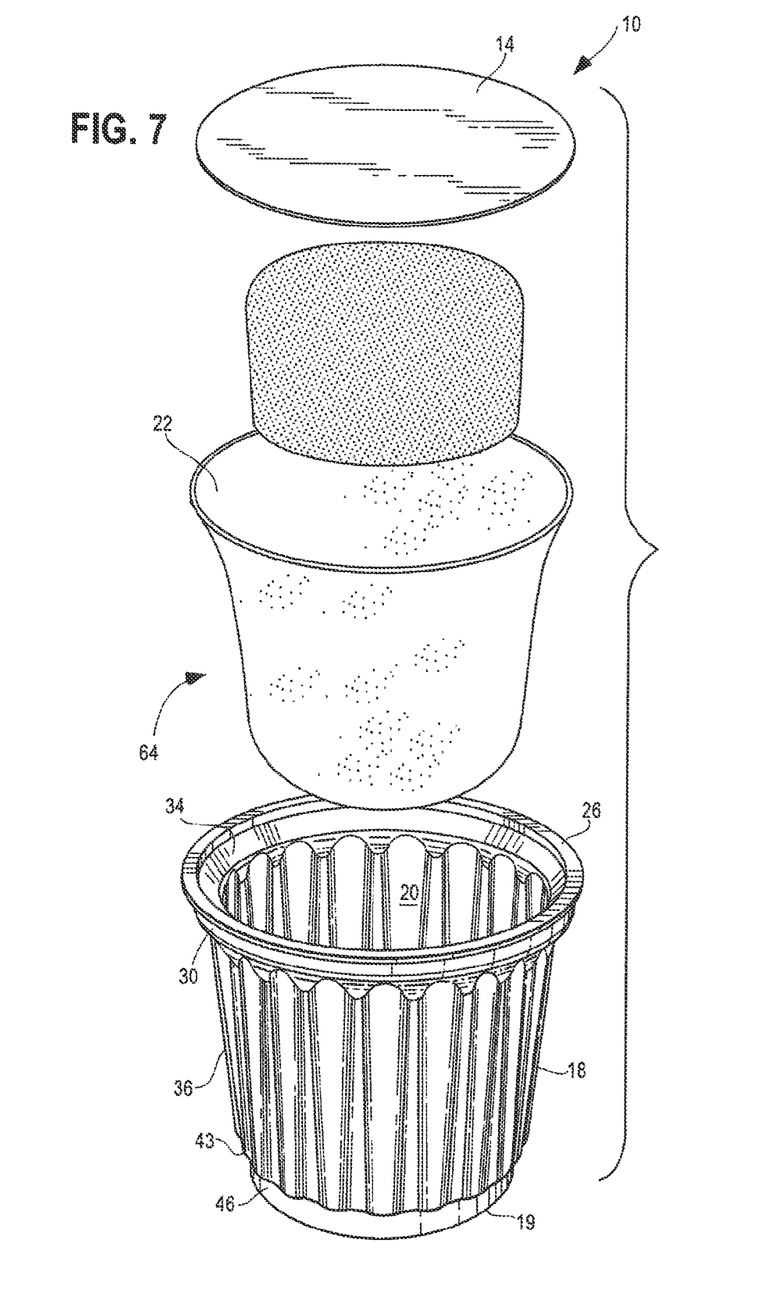
FIG. 7 is a cross-sectional view of two coffee pod containers in a stacked orientation.

Instead, as shown in FIG. 7, the geometry of the foot 52 can be configured to resist buckling. More specifically, the sidewall 18 has a slightly larger thickness than the bottom wall 16 such that the pierce force of the bottom wall 16 is less than to the force required to buckle the sidewall 18 as a result of a compression force applied to the bottom wall 16. The side wall bottom wall portion 46 can extend inwardly from the bottom wall 16 at between 0 and 10 degrees from vertical, and more specifically between 1 and 5 degrees. In the illustrated form, the bottom wall portion 46 extends at about 2 degrees from vertical. Additionally, the bottom wall portion 46 can have a height that is between about 11% and about 20% of a total height of the sidewall, and specifically between about 14% and 17% of a total height of the sidewall 18, and more specifically about 15% of a total height of the sidewall 18. In the illustrated form, the sidewall 18 is about 44 mm and the bottom wall portion 46 is about 7 mm. In other forms, the bottom wall portion 46 can be between 5 mm and 9 mm.

Moreover, the location on the bottom wall 16 for piercing also factors into the forces created during piercing. The raised interior region 58 is configured to be pierced rather than the outer annular ring 60. More specifically, the bottom wall 16 is configured to be pierced by the needle 78 off-center in a ring portion 84. In the illustrated form, the bottom wall 16 is about 35.3 mm in diameter and the ring portion has an outer diameter of about 29 mm and an inner diameter of about 11 mm. In practice, an inner radial surface of the piercing opening is spaced from a center of the bottom wall 16 between about 9.5 mm and 12.7 mm. Additionally, the needle 78 can have a diameter of about 2.5 mm.

Given the nature of mass-producing plastic containers, the thickness of the sidewall 18 and bottom wall 16 of the cups can have slight variations. Accordingly, the cup 10 as described herein is advantageously designed so that a ratio of the thickness of the sidewall bottom portion 46 generally in the area marked by X in FIG. 2 and the thickness of the bottom wall generally in the area marked by Y in FIG. 4, X:Y, can have an average greater than 1, so that, on average, the sidewall bottom portion 46 has a greater thickness than the bottom wall portion 16 in the areas indicated by X and Y. In one form, the thickness ratio of X:Y preferably has an average between about 0.99 and 1.05, and more preferably between 1.01 and 1.03. In such cases, the standard device of the thickness ratio X:Y can be between 0.13 and 0.15. Stated in a different way, the thickness ratio X:Y can be within the range of 0.63 and 1.68, specifically within the range of 0.71 and 1.32.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

The invention claimed is:

1. A coffee pod comprising:
 a container body having an interior and an open top;
 a filter adhered to the container body within the interior thereof;
 a cover sealed to the container over the open top thereof;
 wherein the container body includes:
  a top neck portion having a vertical plane passing therethrough;
  a bottom wall portion having an outer edge; and
  a side wall portion including:
  a foot portion,
  a stacking shoulder, and
  an upper portion;
  the stacking shoulder located above the foot portion and closer to the bottom wall portion than to the top neck portion,
  the foot portion including a plurality of projections spaced around the bottom wall portion and extending between the bottom wall portion outer edge and the stacking shoulder;
  the upper portion extending upwardly from the stacking shoulder, the stacking shoulder being between the foot portion and the upper portion,
  a bottom of the top neck portion and a top of the upper portion of the side wall portion being interconnected by an inwardly sloped wall portion extending from the bottom of the top neck portion in an inwardly direction toward the top of the upper portion of the side wall portion such that an exterior surface of the inwardly sloped wall portion is at an angle of about 40-50 degrees relative to a portion of the vertical plane extending downwardly from the top neck portion,
  the inwardly sloped wall portion having the filter adhered thereto,
 wherein a lower portion of the side wall portion adjacent to the stacking shoulder has an average thickness greater than an average thickness of the bottom wall portion within a piercing area thereof to resist buckling as a result of the bottom wall being pierced.

2. The coffee pod of claim 1 wherein a ratio of a thickness of the side wall lower portion adjacent to the stacking shoulder and the bottom wall portion within the piercing area has an average value of between about 1.01 and 1.03.

3. The coffee pod of claim 1 wherein the side wall lower portion extends inwardly between 0 and 10 degrees from vertical.

4. The coffee pod of claim 1 wherein the side wall lower portion has a height of about 15% of a total height of the container body.

5. The coffee pod of claim 1 wherein the bottom wall portion includes a raised interior portion and an outer annular portion.

6. The coffee pod of claim 5 wherein the raised interior portion is configured to be pierced by an inlet needle in an off-center location thereof.

7. A method of forming the container body of the coffee pod of claim 1, the method comprising:
forming a container body out of a plastic material, wherein forming the container body comprises:
forming the side wall portion to include the inwardly sloped wall portion adjacent a top edge thereof and the stacking shoulder adjacent a bottom edge thereof;
forming the bottom wall portion having a raised interior region and outer annular portion.

8. A method of brewing a beverage using the coffee pod of claim 1, the method comprising:
piercing the cover with a device configured to dispense a liquid into the container body interior;
piercing the bottom wall portion with an instrument to create a dispensing opening therein, the container body being configured to resist buckling due to the piercing of the bottom wall portion.

9. A coffee pod comprising:
a container body having an interior and an open top;
a filter adhered to the container body within the interior thereof;
a cover sealed to the container over the open top thereof;
wherein the container body includes:
a top neck portion having a vertical plane passing therethrough;
a bottom wall portion having an outer edge;
a side wall portion including:
a foot portion,
a stacking shoulder, and
an upper portion;
the stacking shoulder located above the foot portion and closer to the bottom wall portion than to the top neck portion,
the foot portion including a plurality of projections spaced around the bottom wall portion and extending between the bottom wall portion outer edge and the stacking shoulder;
the upper portion extending upwardly from the stacking shoulder, the stacking shoulder being between the foot portion and the upper portion;
an inwardly sloped wall portion of the side wall upper portion having the filter adhered thereto, wherein the inwardly sloped wall of the side wall upper portion interconnects the top neck portion and the side wall upper portion and extends from the top neck portion in a direction toward the side wall upper portion such that an exterior surface of the inwardly sloped wall portion is at an angle of about 40-50 degrees relative to the vertical plane extending downwardly from the top neck portion.

10. The coffee pod of claim 9 wherein the inwardly sloped wall portion extends at about 45 degrees relative to the vertical plane.

11. The coffee pod of claim 9, wherein the sidewall lower portion adjacent to the stacking shoulder has an average thickness greater than an average thickness of the bottom wall portion within a piercing area thereof to resist buckling as a result of the bottom wall being pierced.

12. The coffee pod of claim 11 wherein a ratio of a thickness of the side wall lower portion and the bottom wall portion has an average value of between about 1.01 and 1.03.

* * * * *